Aug. 16, 1938.   E. J. COOK   2,127,160
ENGRAVING APPARATUS
Filed Feb. 19, 1934   5 Sheets—Sheet 3

Inventor
Everett J. Cook
ATTORNEYS

Aug. 16, 1938.          E. J. COOK                 2,127,160
                    ENGRAVING APPARATUS
                   Filed Feb. 19, 1934        5 Sheets-Sheet 5

INVENTOR
Everett J. Cook
BY
ATTORNEYS

Patented Aug. 16, 1938

2,127,160

UNITED STATES PATENT OFFICE 2,127,160

ENGRAVING APPARATUS

Everett J. Cook, Toledo, Ohio, assignor, by mesne assignments, to H. H. Buggie & Company, Toledo, Ohio, a corporation of Ohio Application February 19, 1934, Serial No. 712,085

25 Claims. (Cl. 178—6.6)

The invention relates to engraving apparatus and refers more particularly to apparatus for cutting designs in material having arcuate or flat surfaces where the depth of relief is appreciable as distinguished from the depth of relief of a few thousandths of an inch required for half-tone printing plates and the like. The apparatus is adapted to cut designs in accordance with images or patterns and may be used in the manufacture of stamps or dies for use in printing various materials such as wood, paper, card-board, wall paper, cloth, linoleum, and the like and also may be used in the manufacture of wood cuts, signs, memorial stones, perforating dies and the like.

One of the objects of the invention is to provide an apparatus having a cutter adapted to automatically cut within relatively small tolerances and in accordance with an image a design having an appreciable depth of relief. Other objects are to control the cutter by a light sensitive cell which in turn is controlled by light reflected from the image; to compensate for the size of the cutter, for the rate of movement of the work past the cutter and also for the interval of time required in moving the cutter between its inner and outer limits of travel for respectively cutting the work to the full predetermined depth and clearing the work; to accomplish this compensation by predetermining the dimensions of the area of light projected upon the image; to provide for proper registration of the cuts made by the cutter in the work during its movement back and forth; to move the cutter into and out of engagement with the work by an electro-magnet designed to operate very rapidly; and to control the electro-magnet by a rectified high cycle current to increase the accuracy of control so that the error is very small.

Further objects are to provide an improved device for moving the image and work carrying members back and forth to move the image past the light sensitive cell and the work past the cutter; to provide an improved device for varying the stroke of these members; to provide an improved motor for driving the cutter alternately in opposite directions; to provide an improved device for feeding the light sensitive cell and the cutter step by step in a direction transverse to the movement of the members carrying these elements; and to provide a single control for the device for moving the image and work carying members, the motor and the feeding device.

These and other objects of the invention will become more apparent from the following description and claims, taken in connection with the accompanying drawings, in which

Figure 9 is an enlarged view, partially in section, of a portion of Figure 1;

The apparatus, in general, comprises two oscillatable cylinders, one cylinder having secured to its surface the image to be reproduced and the other cylinder having secured to its surface the work or material to be engraved. A scanning unit comprising an exciter lamp and a light sensitive cell is movable step by step longitudinally of the cylinder carrying the image and an engraving unit comprising a cutter, a motor for driving the cutter and an electro-magnet for axially moving the cutter is correspondingly movable longitudinally of the cylinder carrying the work. The exciter lamp casts light of predetermined area upon the image and this light is reflected by the image to the light sensitive cell with an intensity which varies according to the characteristics of the image. The reflected light, if of sufficient intensity, causes the light sensitive cell to produce a signal which through an amplifier controls the electro-magnet. The latter in turn controls the cutter to thereby reproduce the image.

As shown in the present instance, the apparatus is designed to form stamps or dies formed of rubber or like material.

Figure 1:
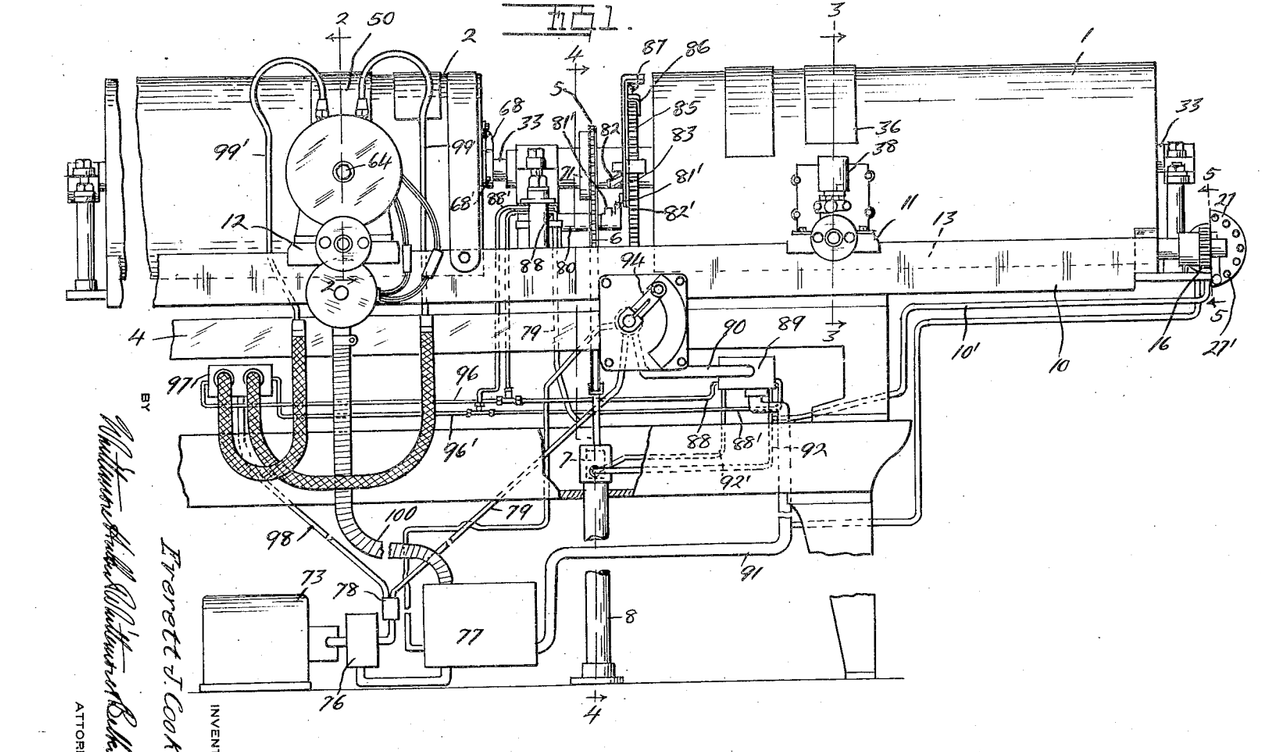
Figure 1 is an elevation of an apparatus showing an embodiment of my invention.
Figure 2:
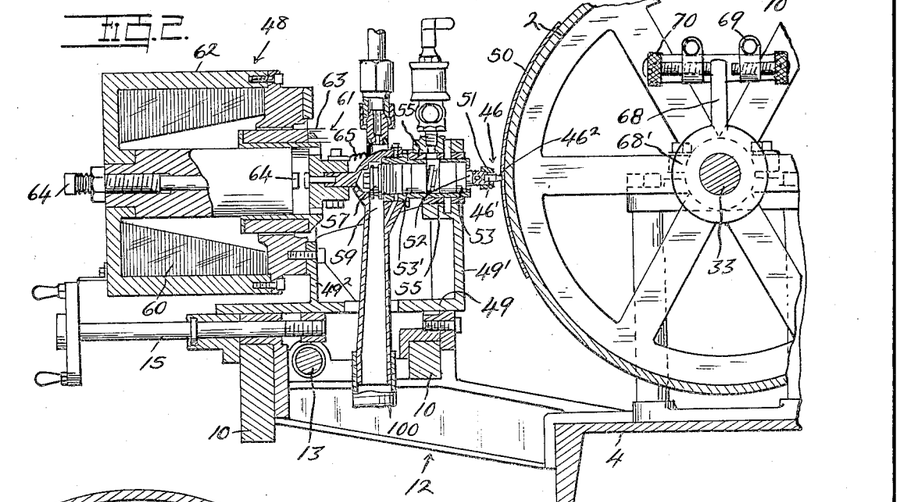
Figures 2, 3, 4, and 5 are enlarged cross sections respectively on the lines 2—2, 3—3, 4—4 and 5—5 of Figure 1.
Figure 3:
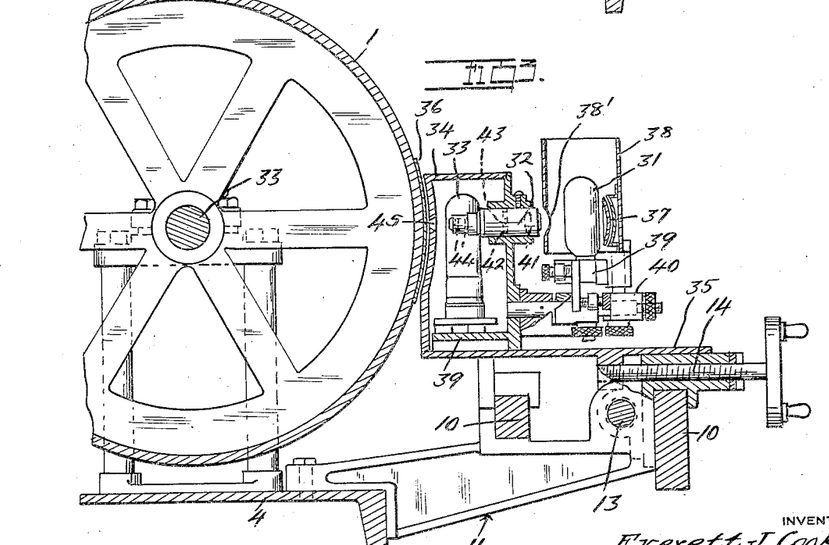

Referring to the drawings, 1 is the cylinder carrying the image and 2 is the cylinder carrying the work. The diameter of the cylinder 1 is approximately equal to the diameter of the cylinder 2 plus double the thickness of the work. The cylinder 1 is fixedly mounted upon the rotatable drive shaft 33 which is journaled upon the bed 4 of the apparatus. The cylinder 2 is rotatably mounted upon the drive shaft in spaced relation to the cylinder 1. A lost motion driving connection is provided between the drive shaft and the cylinder 2. The drive shaft is adapted to be oscillated by means of the sprocket 5 fixedly secured to the drive shaft between the cylinders and the sprocket chain 6 extending over the sprocket and having depending ends connected to the pistons 7 slidable within the vertically extending cylinders 8 and 8' which are spaced apart a distance substantially equal to the pitch diameter of the sprocket. The upper end of each cylinder is provided with the port 9 through which a suitable medium under pressure, such as oil in the present instance, passes into and out of the cylinder. This medium alternately flows into and out of the cylinders through their respective ports to alternately rotate the drive shaft in opposite directions. For example, assume the medium to flow into the cylinder 8, this medium moves the piston in this cylinder downwardly and through the sprocket chain rotates the drive shaft in one direction and also raises the piston in the cylinder 8', forcing the medium from this last cylinder. After the drive shaft has been rotated in the one direction, the medium is then directed to the cylinder 8', thereby reversing the rotation of the drive shaft and raising the piston in the cylinder 8 and causing the medium to be discharged from the last cylinder.

Mounted upon the bed 4 in front of and parallel to the cylinders 1 and 2 are the ways 10 upon which the scanning unit carriage 11 and the engraving unit carriage 12 are adapted to slide. These carriages are moved equally and simultaneously by the cross feed screw 13 journaled upon the bed 4. In the present instance the screw has a right hand threaded portion for engaging one carriage and a left hand threaded portion for engaging the other carriage, so that the carriages are adjusted in opposite directions. The carriages are also made to provide for adjustment of the scanning unit and the engraving unit toward and away from their respective cylinders by the screws 14 and 15 respectively.

Figures 4, 7, 11:
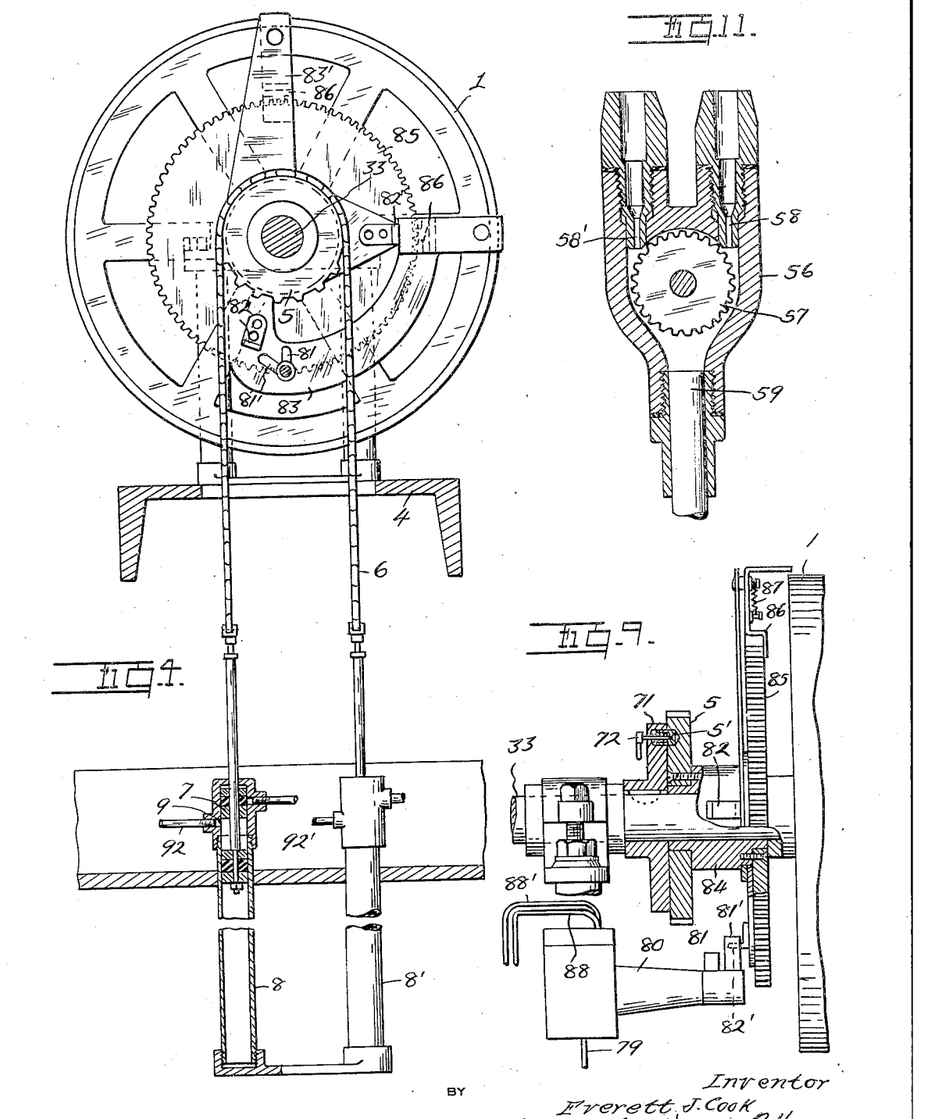
Figure 7 is an enlarged cross section through a portion of Figure 3.
Figure 11 is a cross section on the line 11—11 of Figure 10.
Figure 5:
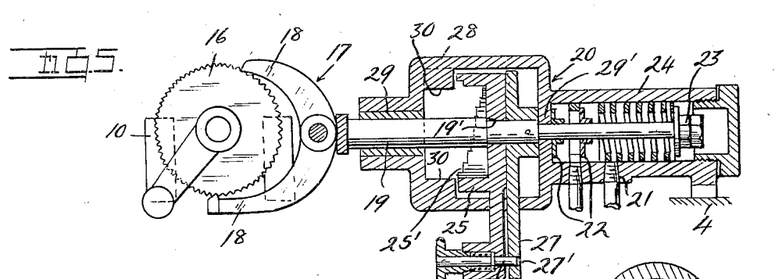
Figure 6:
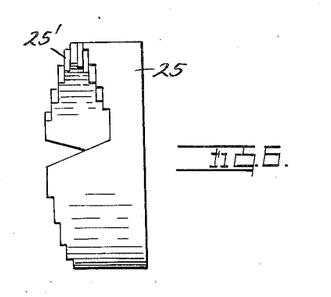
Figure 6 is an enlarged side elevation of the stepped cam of Figure 5.
Figures 7, 8, 10:
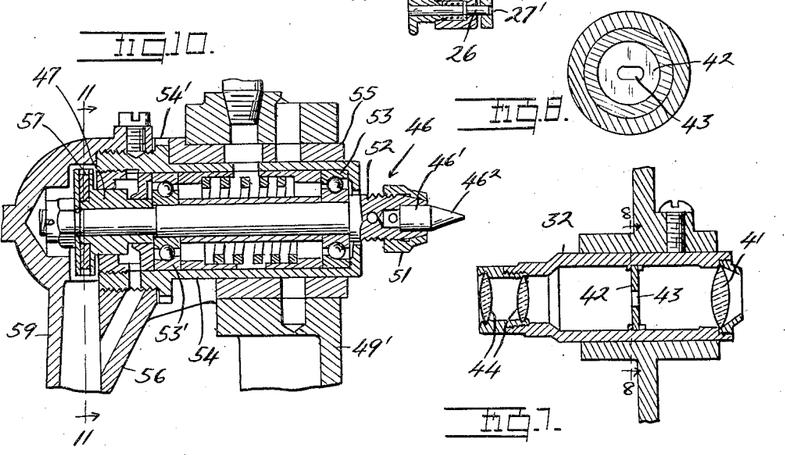
Figure 8 is a cross section on the line 8—8 of Figure 7.
Figure 10 is an enlarged section of a portion of Figure 2.

For indexing or successively advancing the cross feed screw 13 through measured small increments to accomplish the scanning of the image by the scanning unit and the reproduction of this image, the toothed wheel 16 is fixedly secured to one end of the screw and actuated by the double ended pawl 17. This pawl has the pallets 18 which are alternately engageable with the teeth of the toothed wheel above and below its axis. The pawl is pivotally mounted upon one end of the reciprocable rod 19 which extends into the cylinder 20 and acts as a piston. The cylinder is fixedly mounted upon the bed 4 and is provided near one of its ends with the port 21. 22 is a seal near this port, 23 are nuts upon the end of the rod 19 within the cylinder and 24 is a coil spring encircling the rod and abutting the seal and the adjacent nut. A medium under pressure, such as oil in the present instance, passes into and out of the cylinder through its port and the arrangement is such that when the medium enters the cylinder it moves the rod outwardly and through the upper pallet of the pawl and the toothed wheel rotates the cross feed shaft a measured small increment. This movement places the coil spring under additional compression. When the pressure upon the medium within the cylinder is relieved, the coil spring moves the rod inwardly, thereby forcing the medium out through the port of the cylinder and through the lower pallet of the pawl and the toothed wheel rotating the cross feed screw in the same direction and through the same increment.

For predeterminedly varying the stroke of the pawl and the amount of feed of the cross feed screw, there is the stepped cam 25 which is rotatably adjustable and which is held in its various positions by means of the spring pressed plunger 26. More particularly, this stepped cam 25 is sleeved upon the rod 19 between the annular shoulder 19' upon this rod and the plate 27 fixed upon the rod. 28 is a support preferably integral with the cylinder 20. This support has the axially spaced bearings 29 and 29' for the rod and between these bearings are located the stepped cam 25 and the plate 27. The plate is adapted to abut the bearing 29' to limit inward movement of the rod 19 relative to the cylinder. For variably limiting the outward movement of the rod, the stepped cam 25 has the annular series of steps or shoulders 25' which extend axially and are symmetrically disposed with respect to a radial plane including the axis of the cam. Diametrically opposite shoulders 30 are provided upon the support 28 for abutting a pair of like steps or shoulders 25' upon outward movement of the rod 19. The spring pressed plunger 26 is mounted upon the stepped cam 25 outside the support 28 and this plunger is adapted to engage one of the arcuate series of openings 27' in the plate 27. This plate is held from rotation by engaging the support above and below the stepped cam.

The scanning unit comprises the exciter lamp 31, the lens barrel 32, the light sensitive cells 33, the light sensitive cell house 34 and the table 35. The table carries all of these elements and is mounted upon the carriage 11 and is adjusted relative to the cylinder 1 and more particularly the image by the screw 14 to properly focus the light upon the image. This image is, in the present instance, the sketch 36 having white and black portions and secured to the surface of the cylinder 1.

The lamp 31 and its reflector 37 are mounted within the housing 38 which is in front of the lens barrel and the light sensitive cell house. The lamp is mounted upon the support 39 which is universally mounted upon the light sensitive cell house 34 to provide for proper positioning of the lamp filament with respect to the lens barrel 32. The reflector 37 is carried by the housing 38 and this housing is mounted upon the support 40 which is universally mounted on the house 34 to provide for proper positioning of the reflector with respect to the lamp filament and the lens barrel. Within the front end of the lens barrel 32 is the condenser lens 41 for gathering the light from the lamp 31, this light passing through the opening 38' in the housing 38. This lens focuses the light at a position intermediate the ends of the barrel where the partition 42 is located. The partition is provided with the aperture 43 through which a portion of the focused light passes. This light having the outline of the periphery of the aperture 43, is then focused on the image by the objective lens 44 within the rear end of the barrel. The interior of the barrel and the partition are painted dull black to eliminate reflection of the light. The lens barrel is mounted upon and extends rearwardly within the light sensitive cell house 34, which has the opening 45 in its rear wall to permit the passage of the light to the image and its reflection from the image to the light sensitive cells 33, which in the present instance are photo-electric cells. These cells lie at opposite sides of the lens barrel and are arranged to receive as much of this reflected light as possible. All other light is prevented from entering through the opening 45, the rear wall of the light sensitive cell house being concave to correspond to the contour of the cylinder 1 and the image 32 to extend in close proximity thereto.

The engraving unit comprises the cutter or engraving tool 46, the motor 47 for rotating the cutter, the electro-magnet 48 for moving the cutter axially toward and away from the work and the table 49. The table carries these elements and is mounted upon the carriage 12 and is adjusted relative thereto by the screw 15 to adjust the cutter relative to the work. The work in the present instance is the strip 50 of rubber composition secured to and having the curvature of the surface of the cylinder 2.

The cutter 46 is formed of a suitable composition such as abrasive material and a binder. This cutter has the cylindrical body 46' and the conical end $46^2$, a portion of the surface of which is flattened so that the conical end has a combined cutting and abrasive action. The taper of the cutting end is such that with a cut one-eighth of an inch deep the cutting end has a cutting diameter of approximately one-sixteenth of an inch at the surface of the work. The cutter is mounted in the chuck 51 which is carried by the spindle 52, the latter being mounted in the anti-friction bearings 53 and 53'. These bearings are mounted within the sleeve 54 which is axially movably mounted in the bushing 55 which latter is secured to the standard 49' upon the table 49. The sleeve is connected to the housing 56 of the motor 47 and the end of the spindle 52 within the housing has fixedly secured thereto the rotor 57 of the motor. This rotor is an impeller having peripheral vanes.

In the cutting of rubber and similar material, it has been found very essential to obtain a very high R. P. M. of the cutter and to also alternate the direction of the cutter so that it rotates in a direction opposite to the direction of travel of the portion of the rubber being cut. In the present instance, the cutter rotates at approximately 60,000 to 75,000 R. P. M.

As shown, the motor housing 56 has the inlet ports 58 and 58' at its upper side and spaced apart about the diameter of the impeller 57. The motor housing also has the outlet port 59 at its lower side. A medium under pressure, which is oil, is directed alternately to the two inlet ports, this medium impinging on the vanes of the impeller, whereby the impeller is alternately driven in opposite directions.

The electro-magnet is of the dynamic type and comprises the field 60 and the armature 61. The field is a wire coil within the housing 62, which latter is fixed upon the standard $49^2$ upon the table 49. The armature is a light aluminum spool with the encircling coil 63 which is formed of a comparatively few turns of fine wire. This armature is connected to the motor housing 56 and extends within the field 60, the arrangement being such that when the electro-magnet is energized the armature through the motor housing 56, the sleeve 54, the spindle 52 and the chuck 51 moves the cutter axially away from the work to clear the same. This movement is limited by the stop 64 which is a rod threadedly engaging the front end of the housing 62 and extending axially thereinto for abutting the armature. The cutter and the chuck, spindle, sleeve, motor housing and armature are movable axially in the opposite direction toward the work by the tension coil springs 65 between the standard 49' and the motor housing 56. The sleeve 54 is provided with an annular shoulder 54' which is adapted to abut the bushing 55 to limit this movement.

Figure 13:
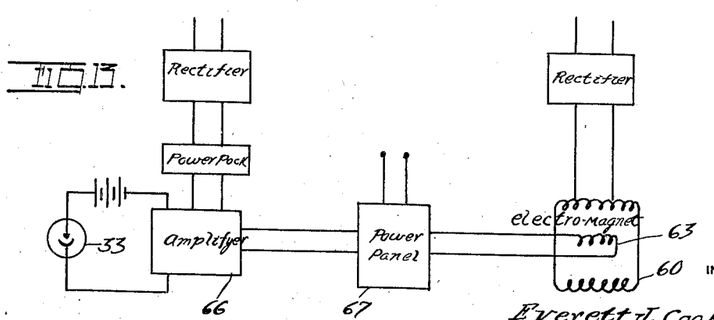
Figure 13 is a diagrammatic view of the electrical portion of the apparatus.

The light sensitive cells 33 are connected in parallel and together produce a greater signal than can be produced by one corresponding cell. As a result, less amplification is required to provide for the control of the comparatively tremendous power required for the operation of the electro-magnet 48 by the relatively small signal produced by the light sensitive cells. In the present instance, 66 is the amplifier of conventional D. C. type, the output of which controls the power panel 67. This power panel is of conventional type and is supplied with a 500 cycle current, which the power panel rectifies and supplies to the armature coil 63. The field 60 is constantly energized during the operation of the apparatus by direct current, preferably of approximately 110 volts. By reason of the rectified or uni-directional 500 cycle current, the electro-magnet is controlled with great accuracy.

In operation, as the scanning unit scans the image 36, the cutter 46 is moved away from and out of contact with the work 50 when the light projected from the lamp 31 passes over the black portions of the image. Also the cutter is moved toward and into engagement with the work when the projected light passes over the white portions of the image.

Assuming the image and the work to be moving very slowly and at such a rate that the time interval required to axially move the cutter throughout its complete stroke in either direction is negligible and practically eliminated, and remembering that the cutter when cutting is one-sixteenth of an inch in diameter at the surface of the work, it is apparent that with the cutter in cutting engagement with the work and with a pin point area of light focused upon the image, the cutter would cut the work about one half the diameter of the cutter at the surface of the work, or about one-thirty-second of an inch before the light would reach the black portion of the image and cause the withdrawal of the cutter. This would also hold true if the cutter were out of cutting engagement with the work and would be caused to move in when the light would reach the white portion of the image. It will therefore be apparent that the height of the area of light focused upon the image or the dimension of the light area parallel to the direction of travel of the image must bear some relation to the size of the cutter so that the latter will exactly reproduce the image.

Also, remembering that the cutter routs to a depth of approximately one-eighth of an inch, an appreciable length of time is required to withdraw the cutter from the work or to return the cutter, this length of time depending on the inertia of the cutter and other elements moving with it, the resistance offered by the springs for moving the cutter in the opposite direction and the rapidity of action of the electro-magnet. Further, remembering that the image and the work are moved at a comparatively fast rate, it will be apparent that the height of the light area must bear some relation to the rate of movement of the image and the work and also some relation to the time interval required to withdraw or return the cutter, so that the latter will exactly reproduce the image.

In the present apparatus, the scanning unit and the engraving unit are moved in a direction transverse to that of the image and the work at a very slow rate and the image and the work are moved at a comparatively fast rate. To secure very good results the width or the dimension of the area of light focused on the image parallel to the direction of travel of the scanning and engraving unit is approximately equal to and preferably slightly greater than the diameter of the cutter at the surface of the work. Also, the height or the dimension of the light area parallel to the direction of travel of the image and the work is narrower than and preferably approximately one-half the diameter of the cutter at the surface of the work. As a result, it will be seen that the apparatus compensates for the size of the cutter, for the rate of movement of the image and the work and also for the time interval required to withdraw or return the cutter in the opposite directions of movement of the image and the work.

Also, in the present apparatus, the image and the work are moved alternately in opposite directions and at a comparatively fast rate as above. Therefore, in order to secure the registration of the cuts made by the cutter in the opposite directions of movement, the image and the light area are moved relatively to each other in advance of the movement of the work and the cutter relative to each other. It will thus be seen that this arrangement compensates for the height of the light area.

As a practical example, with the work moving at the rate of one inch per second, the light area has a height of about .030 of an inch and a width of about .070 of an inch. Withdrawal of the cutter from the work starts as soon as a small fraction of the light from the aperture 43 impinges on a black portion of the image and movement of the cutter into engagement with the work starts when the light is moving off the black portion and about 15 per cent of the light impinges on a white portion of the image.

As shown in the present instance, the advance of timing of the light area to the image with respect to the timing of the cutter to the work is secured by driving the cylinder 2 from the drive shaft 3 by a lost motion connection above referred to. As shown, 68 is a radially extending finger having the hub 68' fixed to the drive shaft and 69 is a U-shaped bracket secured to the adjacent end of the cylinder 2 and having arms embracing the finger. 70 are adjustable set screws threadedly engaging the arms and adapted to abut the finger.

To improve the operation, the aperture 43 has rounded corners and may be said to be generally oval in shape. As a result, the area of light projected on the image is correspondingly shaped.

For the purpose of permitting the drive shaft 3 and consequently the cylinders 1 and 2 to be manually turned, the sprocket 5 is not keyed or pinned directly to the shaft, but is adapted to be connected thereto by the collar 71. This collar is keyed to the drive shaft and extends at one side of the sprocket and carries the spring pressed plunger 72 which is engageable in one of an annular series of spaced recesses 5' in the sprocket.

Figure 12:
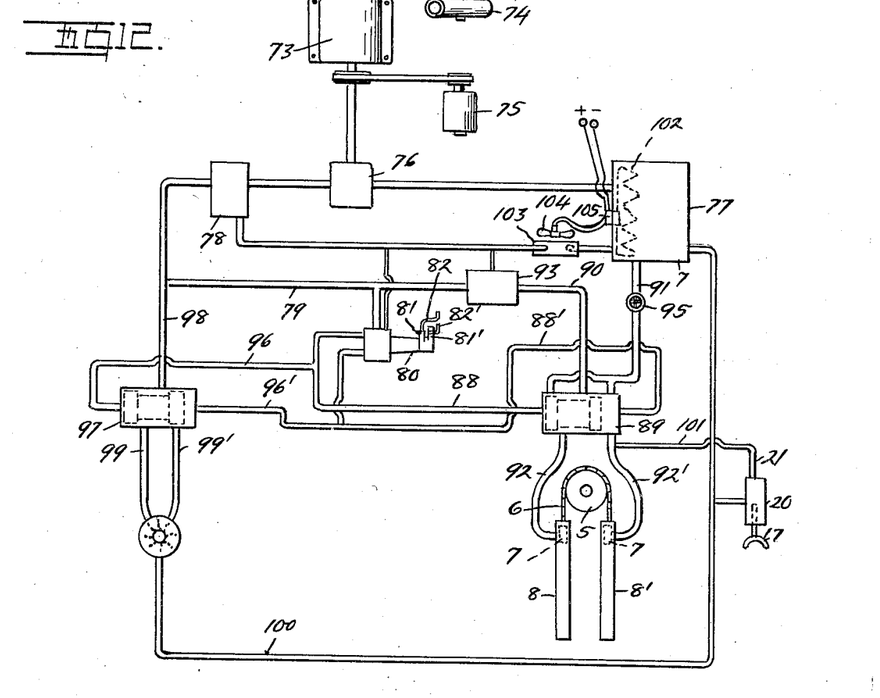
Figure 12 is a diagrammatic view of the hydraulic portion of the apparatus.

The electric motor 73 supplies the power to drive the apparatus. To its shaft are preferably belted the blower 74 for removing dust created by the operation of the cutter 46 upon the work 50, and the 500 cycle generator 75 used in conjunction with the power panel 67 to energize the armature 61. Also one end of its shaft is connected through a flexible coupling to the rotary pump 76. This pump draws the oil, which, as above stated, is the medium for actuating different movable parts of the apparatus from the tank 77 and pumps it through the pressure regulating valve 78 which is of conventional type and maintains the oil under a uniform operating pressure of approximately 1000 pounds per square inch. The pipe 79 leads from this pressure regulating valve to the pilot valve 80 which is controlled by the sprocket 5 and which in turn controls the rotation of the cylinders 1 and 2 alternately in opposite directions, the feed of the cross feed screw 13 and the rotation of the motor 47 alternately in opposite directions.

The pilot valve 80 is of conventional type and mounted upon the bed 4 below the sprocket 5 and between the depending portions of the sprocket chain 6. This valve has the upwardly extending diverging fingers 81 and 81' which are adapted to be engaged by the dogs 82 and 82' respectively. The dogs are secured to the blades 83 and 83' respectively, which are journaled upon the sleeve 84 at one side of the toothed wheel 85. Each blade carries the dog 86 at its outer end for engaging one or more teeth of the toothed wheel to angularly position each blade with respect to the toothed wheel. Each dog 86 is slidable radially of its blade and normally urged radially inwardly by the coil spring 87. The toothed wheel 85 is fixedly secured to one end of the sleeve 84 and the sprocket 5 is fixedly secured to the other end of sleeve.

With this arrangement it will be seen that by angularly adjusting the blades 83 and 83' their dogs 82 and 82' respectively may be made to trip the pilot valve at different periods in the rotation of the drive shaft 3 and the cylinders 1 and 2.

Pipes 88 and 88' lead from the outlets of the pilot valve 80 to the four-way valve 89 of conventional piston type. These pipes alternately direct the oil to this four-way valve in opposite directions to move its piston in opposite directions. 90 is a pipe communicating with the pipe 79 and leading to the four-way valve 89 and 91 is the outlet pipe leading from the four-way valve to the tank 77. 92 and 92' are pipes leading from the four-way valve to the cylinders 8 and 8' respectively. The piston in one position connects the pipe 90 to the pipe 92 and also connects the outlet pipe 91 to the pipe 92'. In the other position of the piston the connections are reversed, the pipe 90 being connected to the pipe 92' and the outlet pipe 91 being connected to the pipe 92. Thus, the pipes 92 and 92' make high pressure and low pressure connections to the cylinders 8 and 8' alternately. Also by this construction the pilot valve controls the rotation of the drive shaft 3 and the cylinders 1 and 2 alternately in opposite directions. Further, by reason of the angularly adjustable blades controlling the tripping of the pilot valve, the stroke of the cylinders 1 and 2 may be controlled.

For controlling the speed of the apparatus, there is the metering valve 93 of conventional type in the pipe 90. This metering valve is mounted at the front side of the bed 4 and may be adjusted by the crank 94.

The valve 95 of standard construction is located in the outlet pipe 91, this valve being adjusted to maintain a small back pressure to steady the operation of the system.

Pipes 96 and 96' also lead from the outlets of the pilot valve 80 to the four-way valve 97 of conventional piston type. These pipes direct the oil to this four-way valve in opposite directions to move its piston in opposite directions. 98 is a pipe leading from the pressure regulating valve 78 to the four-way valve 97. 99 and 99' are pipes leading from the four-way valve to the inlet ports 58 and 58' of the motor housing 56 and adapted to be alternately connected to the pipe 98 in accordance with the position of the piston. The oil in either event passes from the motor housing through the outlet port 59 and the pipe 100 to the tank 77. Thus it will be seen that the pilot valve also controls the rotation of the impeller 57 and consequently the cutter 46 alternately in opposite directions. Also that the direction of rotation changes at the ends of the stroke of the cylinders 1 and 2.

The pipe 100 and also the pipes 99 and 99' are flexible to provide for movement of the cutter toward and away from the work and also movement of the engraving unit carriage along its ways. These pipes, however, serve to hold the motor housing 56 from rotation.

To operate the cross feed screw 13, either the pipe 92 or the pipe 92' is connected by the pipe 101 to the port 21 of the cylinder 20 to make high pressure and low pressure connections with this cylinder. The arrangement is such that the pressure of the oil in the pipe 101 changes only at the ends of the stroke of the cylinders 1 and 2 and as a result the cross feed shaft is advanced only at these times.

Suitable pipes or bleed lines lead from all of the valves and hydraulically driven parts to the tank 77 to return all oil which leaks past the packing glands.

The hydraulic operation of the various devices is effected by the temperature of the medium used which, as before stated, is oil in the present instance. The oil is less viscous at high temperatures than at low temperatures and so the electric resistance type heater 102 is provided in the tank 77 to heat the oil and the radiator 103 is connected in the by-pass from the pressure regulating valve 78 to the tank 77. The fan 104 is provided for forcing air through the radiator for the purpose of cooling the oil. The thermostat 105 located in the oil tank turns on the heater 102 when the oil gets below a predetermined temperature and turns the heater off and the fan 104 on at a pretetermined higher temperature. By these means the temperature of the oil is maintained within a very few degrees and consequently the viscosity of the oil is maintained within small limits. This is absolutely essential to secure the accurate and uniform operation which is required to properly produce the work.

What I claim as my invention is:

1. In a light sensitive engraving apparatus, the combination of a reciprocable image carrying member, a reciprocable work carrying member, a unit having a light sensitive cell for scanning the immage, a unit having a reciprocable cutter movable into and out of engagement with the work and adapted to cut the work to an appreciable depth, said cutter being controlled by said light sensitive cell, and means for securing an advance in timing of the scanning with respect to the timing of the cutting.

2. In a light sensitive engraving apparatus, the combination of a reciprocable image carrying member, a reciprocable work carrying member, a unit for scanning the image having means for projecting light upon the image and a light sensitive cell controlled by the reflection of the projected light, a unit for cutting the work having a reciprocable cutter movable into and out of engagement with the work, said cutter being controlled by said light sensitive cell and having an effective cutting portion of appreciable size adapted to cut the work to an appreciable depth, and means for securing an advance in timing of the scanning with respect to the timing of the cutting.

3. In a light sensitive engraving apparatus, the combination of a reciprocable work carrying member, a reciprocable image carrying member, a unit for cutting the work having a reciprocable cutter movable into and out of engagement with the work, said cutter having an effective cutting portion of appreciable size and being adapted to cut the work to an appreciable depth, a unit for scanning the image having means for projecting light upon the image having an area with a height in the direction of travel of the image less than the diameter of said effective cutting portion and a transverse width slightly greater than the diameter of said effective cutting portion, said scanning unit also having a light sensitive cell controlled by the reflection of the projected light and in turn controlling said cutter, and means for securing an advance in timing of the scanning with respect to the timing of the cutting.

4. In a light sensitive engraving apparatus, the combination of a reciprocable work carrying member, a reciprocable image carrying member, a unit for cutting the work having a reciprocable cutter movable into and out of engagement with the work, said cutter having an effective cutting portion of appreciable size and being adapted to cut the work to an appreciable depth, a unit for scanning the image having means for projecting light upon the image having a substantially oval aperture with a height in the direction of movement of the image less than the width in a transverse direction, said scanning unit also having a light sensitive cell controlled by the reflection of the projected light and in turn controlling said cutter, and means for securing an advance in timing of the scanning with respect to the timing of the cutting.

5. In a light sensitive engraving apparatus, the combination of a reciprocable member carrying an image, a second reciprocable member carrying the work, a unit having a light sensitive cell for scanning the image, a second unit having a reciprocable cutter movable into and out of engagement with the work, said cutter being controlled by said light sensitive cell and being adapted to cut the work to an appreciable depth, and means for reciprocating said image and work carrying members, said means having a lost motion driving connection with said work carrying member.

6. In a light sensitive engraving apparatus, the combination of an oscillatable member carrying an image, a second oscillatable member carrying the work, a unit having a light sensitive cell for scanning the image, a second unit having a reciprocable cutter movable into and out of engagement with the work, said cutter being controlled by said light sensitive cell and being adapted to cut the work to an appreciable depth, and an oscillatable drive shaft having a lost motion driving connection with said work carrying member.

7. In a light sensitive engraving apparatus, the combination of a reciprocable member carrying an image, a second reciprocable member carrying the work, a unit for scanning the image having means for projecting light upon the image and a light sensitive cell controlled by the reflection of the projected light, a second unit for cutting the work having a reciprocable cutter movable into and out of engagement with the work, said cutter being controlled by said light sensitive cell and having an effective cutting portion of appreciable size adapted to cut the work to an appreciable depth, and means for reciprocating said image and work carrying members, said means having a lost motion driving connection with said work carrying member.

8. In a light sensitive engraving apparatus, the combination of an oscillatable member carrying an image, a second oscillatable member carrying the work, a unit for scanning the image having means for projecting light upon the image and a light sensitive cell controlled by the reflection of the light, a second unit for cutting the work having a reciprocable cutter movable into and out of engagement with the work, said cutter being controlled by said light sensitive cell and having an effective cutting portion of appreciable size and being adapted to cut the work to an appreciable depth, and an oscillatable drive shaft for driving said image and work carrying members, said drive shaft having a lost motion driving connection with said work carrying member.

9. In an engraving apparatus, the combination of an oscillatable image carrying member, an oscillatable work carrying member, an oscillatable drive shaft and means for oscillating said drive shaft, said means comprising a toothed member journaled upon said drive shaft, an adjacent collar rotatably fixed to said drive shaft, and releasable means for driving said collar from said toothed member providing for manual rotation of said drive shaft and image and work carrying members independently of said means for oscillating said drive shaft.

10. In a light sensitive engraving apparatus, the combination of a reciprocable member carrying an image, a second reciprocable member carrying work, a unit having a light sensitive cell for scanning the image, a second unit having a reciprocable cutter movable into and out of engagement with the work, said cutter being controlled by said light sensitive cell, and means for rotating said cutter in one direction during the movement of said work carrying member in one direction and in the reverse direction during the movement of said work carrying member in the opposite direction.

11. In an engraving apparatus, the combination of a reciprocable member carrying work, a rotatable cutter for the work, and means for rotating said cutter in one direction during the movement of said member in one direction and in the opposite direction during the movement of said member in the opposite direction.

12. In an engraving apparatus, the combination of a reciprocable member carrying an image, a second reciprocable member carrying the work, a cutter movable into and out of engagement with the work, means for controlling the movement of said cutter in accordance with said image, a hydraulically driven rotor connected to said cutter to rotate the same, and means for directing fluid under pressure against said rotor to alternately drive the same in opposite directions.

13. In an engraving apparatus, the combination of a reciprocable member carrying an image, a second reciprocable member carrying the work, a cutter movable into and out of engagement with the work, means for moving said cutter in accordance with the image, a hydraulically driven motor comprising a rotor connected to said cutter to rotate the same and a housing having spaced inlets for fluid under pressure, and a pilot valve controlled by the movement of one of said reciprocable members for directing the fluid under pressure alternately to said inlets.

14. In an engraving apparatus, the combination of an oscillatable image carrying member, an oscillatable work carrying member, a cutter movable into and out of engagement with the work, means controlling the movement of said cutter in accordance with said image, a hydraulic motor comprising a rotor connected to said cutter to rotate the same and a housing having spaced inlets for fluid under pressure, a pilot valve for directing fluid under pressure alternately to said inlets, and adjustable means oscillatable with said image carrying member for controlling said pilot valve.

15. In an engraving apparatus, the combination of an oscillatable image carrying member, an oscillatable work carrying member, a cutter movable into and out of engagement with the work, means for controlling the movement of said cutter in accordance with said image, an oscillatable drive shaft for said oscillatable image and work carrying members, a sprocket for driving said drive shaft, spaced cylinders, pistons operable within said cylinders, a sprocket chain extending over said sprocket and connected to said pistons, and means controlled by the oscillation of said sprocket for directing fluid under pressure alternately to said cylinders.

16. In an engraving apparatus, the combination of an oscillatable image carrying member, an oscillatable work carrying member, a rotatable cutter movable into and out of engagement with the work, means for controlling the movement of said cutter into and out of engagement with the work in accordance with the image, a carriage for said cutter movable parallel to said work carrying member, a screw for advancing said carriage, and a hydraulically operated motor controlled by the oscillation of said image carrying member for rotating said screw.

17. In an engraving apparatus, the combination of an image carrying element, a work carrying element, a cutter element operable upon the work, hydraulic means for actuating one of said elements, means for maintaining substantially constant viscosity of the hydraulic medium, and means for controlling the operation of said cutter in accordance with the image.

18. In an engraving apparatus, the combination of an image carrying element, a work carrying element, a cutter element operable upon the work, hydraulic means for actuating one of said elements, means for heating and cooling the hydraulic medium to maintain substantially constant viscosity thereof, and means for controlling the operation of said cutter in accordance with the image.

19. In an engraving apparatus, the combination of a movable member carrying an image, a second member carrying the work and movable in opposite directions, a tool movable into and out of engagement with the work, means for controlling the movement of the tool in accordance with the movement of the image, a fluid operated member connected to the tool to rotate the same, and means for directing fluid under pressure against said last named member to alternately drive the same in opposite directions.

20. In an engraving apparatus, the combination of a movable member carrying an image, a second movable member carrying the work, a tool movable into and out of engagement with the work, means for moving said tool in accordance with the movement of the image, a fluid operated motor comprising a rotor connected to the tool to rotate the same and spaced fluid inlets directed toward the rotor upon opposite sides of the axis thereof, and a pilot valve controlled by the movement of one of the members aforesaid for directing the fluid under pressure alternately to the inlets.

21. In a duplicating machine, a movable image carrying member, a movable work carrying member, a unit for scanning the image having means for projecting light upon the image and having a light sensitive cell, a tool movable into and out of engagement with the work, means controlled by the light sensitive cell for moving the tool into and out of engagement with the work, said projecting means provided with an aperture through which light is projected on the image, the aperture having a dimension predetermined with respect to the size of the cutting portion of the tool to secure an advance in timing of the scanning of the image to the timing of the movement of the tool relative to the work by the light sensitive cell to provide the reproduction of the image on the work with sharply defined contour lines.

22. In a duplicating machine, a movable image carrying member, a movable work carrying member, a unit for scanning the image having means for projecting light upon the image and having a light sensitive cell, a tool movable into and out of engagement with the work, means controlled by the light sensitive cell for moving the tool into and out of engagement with the work, said projecting means provided with a substantially elongated aperture through which light is projected on the image, the aperture having a long axis extending transversely to the movement of the image and having a length greater than the diameter of the cutting portion of the tool by an amount predetermined to secure an advance in timing of the scanning of the image to the timing of the movement of the tool relative to the work by the light sensitive cell.

23. In a duplicating machine, a movable image carrying member, a movable work carrying member, a tool movable into and out of engagement with the work, a unit for scanning the image having means including a source of illumination for projecting light toward the image and having an aperture located between the source of illumination and image to cast an area of light on the image controlled by the aperture, a light sensitive cell arranged to receive diffused light reflected from the image, means controlled by the light sensitive cell for moving the tool toward and away from the work, said aperture having a dimension predetermined with respect to the size of the cutting portion of the tool to secure an advance in timing of the scanning of the image to the timing of the movement of the tool relative to the work by the light sensitive cell to provide a reproduction of the image on the work with a width substantially the same as the image.

24. In a duplicating machine, a movable image carrying member, a movable work carrying member, a unit for scanning the image having means for projecting light upon the image and having a light sensitive cell, a tool movable into and out of engagement with the work, means effecting relative traversing movements between the tool and work carrying member and between the scanning unit and image carrying member in directions transverse to the movement of said members, means controlled by the light sensitive cell for moving the tool into and out of engagement with the work, said projecting means provided with an aperture through which light is projected on the image, the aperture having the long axis extending transversely to the movement of the image and having a length sufficiently greater than the diameter of the cutting portion of the tool to secure an advance in timing of the scanning of the image to the timing of the movement of the tool by the light sensitive cell in the directions of relative traversing movement aforesaid, and means for securing an advance in timing of the scanning of the image in the direction of movement of the image to the timing of movement of the tool relative to the work by the light sensitive cell.

25. In a duplicating machine, a movable image carrying member, a movable work carrying member, a tool movable into and out of engagement with the work, a unit for scanning the image having means including a source of illumination for projecting light toward the image and having an aperture located between the source of illumination and image to cast an area of light on the image corresponding in shape to the aperture, a light sensitive cell controlled by the light reflected from the image, means controlled by the light sensitive cell for moving the tool toward and away from the work, and means for securing an advance in timing of the scanning of the image to the timing of movement of the tool relative to the work by the light sensitive cell to provide the reproduction of the image with sharply defined contour lines.

EVERETT J. COOK.